United States Patent
Cutu (10) Patent No.: US 11,846,940 B2
(45) Date of Patent: Dec. 19, 2023

(54) METHODS AND APPARATUS FOR VEHICLE CONTROL

(71) Applicant: Deere & Company, Moline, IL (US)

(72) Inventor: Florin Cutu, San Jose, CA (US)

(73) Assignee: Deere & Company, Moline, IL (US)

( * ) Notice: Subject to any disclaimer, the term of this patent is extended or adjusted under 35 U.S.C. 154(b) by 224 days.

(21) Appl. No.: 17/008,634

(22) Filed: Aug. 31, 2020

(65) Prior Publication Data
US 2021/0064020 A1    Mar. 4, 2021

Related U.S. Application Data

(60) Provisional application No. 62/894,779, filed on Aug. 31, 2019.

(51) Int. Cl.
| | | |
|---|---|---|
| *G05D 1/00* | (2006.01) | |
| *B60W 30/06* | (2006.01) | |
| *B60W 60/00* | (2020.01) | |
| *B64C 39/02* | (2023.01) | |
| *B64U 80/86* | (2023.01) | |
| *B64U 101/30* | (2023.01) | |

(52) U.S. Cl.
CPC ........... *G05D 1/0022* (2013.01); *B60W 30/06* (2013.01); *B60W 60/001* (2020.02); *B64C 39/024* (2013.01); *B64U 80/86* (2023.01); *B64U 2101/30* (2023.01); *B64U 2201/20* (2023.01)

(58) Field of Classification Search
CPC ... G05D 1/0022; G05D 1/0033; B60W 30/06; B60W 60/001; B64C 39/024; B64C 2201/127; B64C 2201/146; B64C 2201/208
See application file for complete search history.

(56) References Cited

U.S. PATENT DOCUMENTS

| | | | |
|---|---|---|---|
| 9,894,327 B1* | 2/2018 | Jacob | B60F 5/02 |
| 2014/0110183 A1* | 4/2014 | Rudakevych | B60L 58/12 |
| | | | 180/68.5 |
| 2016/0129999 A1* | 5/2016 | Mays | B64C 39/024 |
| | | | 701/2 |
| 2018/0079531 A1* | 3/2018 | Bennett | B60L 53/36 |
| 2019/0066503 A1* | 2/2019 | Li | G08G 5/045 |
| 2019/0071179 A1* | 3/2019 | Duncan | G05D 1/0094 |
| 2021/0116907 A1* | 4/2021 | Altman | H04W 4/44 |

* cited by examiner

*Primary Examiner* — Shardul D Patel
*Assistant Examiner* — Christine Nguyen Huynh
(74) *Attorney, Agent, or Firm* — Straub & Straub; Michael P. Straub; Stephen T. Straub (57) ABSTRACT

A drone is deployed from a vehicle, e.g., an autonomous or semi-autonomous vehicle, to assist in vehicle control, e.g. in situations in which the vehicle's embedded sensors may not provide sufficient information to perform a desired operation safely, e.g. backing up, parking in a tight environment, traversing a very narrow road, navigating a sharp corner, or bypassing an obstruction, etc. The deployed drone includes sensors, e.g. cameras, radars, LIDARs, etc, which capture sensor data from a position offset from the vehicle. Captured sensor data is communicated from the drone to a vehicle control system in the vehicle and/or to a remote control system, e.g., including an operator who can make decisions. Based on the captured sensor data, which supplements sensor data collected by the vehicle's embedded sensors, vehicle movement is controlled.

16 Claims, 6 Drawing Sheets

METHODS AND APPARATUS FOR VEHICLE CONTROL

RELATED APPLICATIONS

The present application claims the benefit of U.S. Provisional Application Ser. No. 62/894,779 filed Aug. 31, 2019 which is hereby expressly incorporated by reference in its entirety.

FIELD

The present application relates to vehicle control methods and apparatus and, more particularly to methods and apparatus for controlling a vehicle via a remote control station and/or using input, e.g., images and/or sensor data, sourced from a deployed drone.

BACKGROUND

Maneuvering vehicles when parking or backing up can be difficult for an operator whether that operator is present in a vehicle or located at a remote site. The use of backup cameras has helped to some extent but in some cases the view of a backup camera may be obstructed and/or a view from a location that is not visible from a rear mounted camera could be useful.

In view of the above it should be appreciated that there is a need for additional methods and/or apparatus beyond a simple backup camera for providing views and/or position information when maneuvering a vehicle.

SUMMARY

Various aspects and/or features relate to remote monitoring and/or remote operator control, e.g., of a vehicle. The monitoring can facilitate vehicle positioning, e.g., as part of backing up a truck or other device. Maneuvering a vehicle in places such as gas stations or complex construction zones or tiny streets in city centers is difficult for autonomous systems.

In some embodiments, autonomous vehicles, e.g., in a fleet of trucks or taxis, are fitted with hardware that allows for remote operators to monitor vehicle sensors (primarily video) in real time and also operate the vehicle controls.

In some embodiments, the artificial intelligence (AI) in the vehicle can be, and in some embodiments is, trained to detect situations it cannot handle, and then contact the remote driver for help. Alternatively, in some embodiments, remote operators would constantly monitor the vehicles in the fleet and intervene when necessary.

The bandwidth of the video uplink may be a problem. However, since any complicated maneuvering should be performed at low speeds, this may not be a major issue. In some embodiments, the video feed from the on-board cameras will be compressed and transmitted via a LTE or 5G connection.

In addition to video, other sensor data can be, and sometimes is, transmitted to the remote operators. In some embodiments, the use of the remote operators is to provide on-line training data for difficult traffic situations.

Various aspects and/or features related to drone/remote controlled vehicle for safe backing of semi trucks is described below. Backing up a tractor+trailer is extremely difficult due to the huge blind spots.

In some cases it is not practical to fit trailers with cameras and other sensors because the trailers (as opposed to the tractors) belong to customers and are frequently switched. Attaching a wireless camera or other temporary sensor may pose difficult calibration problems. That means that most or all of the hardware used for Advanced Driver Assistance Systems (ADAS) has to be stored in the tractor. In various embodiments to facilitate maneuvering of a vehicle a drone is deployed from a storage location on the vehicle, e.g., truck, trailer, car, etc. to be maneuvered. Images and/or other sensed data captured by one or more sensors, e.g., cameras, on the drone is communicated, e.g., related, back to the computer and/or control system in the vehicle to be maneuvered and/or back to a vehicle operator who is remotely controlling movement of the main vehicle which is to be maneuvered and/or drone. e.g., via a remote vehicle/drone control station. The drone is, e.g., in the form of an unmanned aircraft, unmanned ship, unmanned boat or unmanned wheeled and/or tracked vehicle which is guided by remote control or onboard computers. The drone is deployed from a storage location on the main vehicle and is to be maneuvered, e.g., automatically under control of a control system in the main vehicle and/or under control of a remote operator responsible for maneuvering the main vehicle and/or drone. The drone can be, and in some embodiments is, a battery operated vehicle which is stored in a storage pod on the main vehicle when not in use, deployed from the pod, and which is controlled to return to the pod for storage at the end of use, e.g., upon completion of a parking or other maneuvering operation in which images and/or other data captured by the drone are used to facilitate automated control system and/or operator maneuvering of the main vehicle, e.g., tractor trailer including a cab and, in some cases, trailer, to be parked.

In some embodiments, the drone is a flying drone equipped with a camera that is stored in the main vehicle, e.g. cab and/or trailer of a tractor trailer. The drone is released when the truck has to backup, or in any other situation where a slow speed maneuver that benefits from a birds eye view is useful. The video stream from the drone is used by the control system, which in some embodiments is an artificial intelligence (AI) system in the truck as input to facilitate performing a safe back up and/or other maneuver. In addition to being provided to the automated or semi-automated AI control system in the main vehicle, the video and/or other sensor feed(s) from the drone is, in some embodiments, supplied to a remote operator, e.g., a remote human operation located at a physically remote location relative to the main vehicle, and the remote human operator then controls the main vehicle to back up or perform another maneuver based on the sensed information, e.g., video, from the drone alone or in conjunction with the assistance of the automated control system on the main vehicle. For example the human operator may select a location in which the vehicle is to park based on the received video, signal the location to the automated controller, and the automated control system on the main vehicle then controls the vehicle to maneuver into the parking location designated by the remote human operation. In many cases the maneuvering by the control system takes into consideration the position and location of objects detected by the drone's sensors either visually or through the use of radar or other location detection techniques. In some embodiments the position of objects relative to the main vehicle and/or drone is determined based on images captured by the drone, e.g., with images from cameras at different locations on the drone providing depth information and the location of the drone based on GPS information or other information allowing the location of objects to be determined in the environment relative to the drone and/or main vehicle.

In cases where a flying drone is not possible to use due to weather or insufficient headroom or legal restrictions, in some embodiments a small wheeled radio controlled car is included and used for providing a video feed behind the truck. This remote 'toy car' can act as a remote sensor and/or pilot for the big truck, effectively guiding it through a complex environment by providing video and/or other information that can be used to control or facilitate maneuvering of the truck or other vehicle.

An exemplary method of controlling a vehicle, in accordance with some embodiments, comprises: deploying a drone including one or more sensors; operating the drone to capture sensor data from a position offset from the position of the vehicle; and operating the drone to wirelessly communicate captured sensor data, e.g., to the vehicle and/or to a remote control station. In some such embodiments, the exemplary method further comprises, operating a control system in the vehicle to control vehicle movement as a function of sensed data communicated by the drone.

While various features and embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
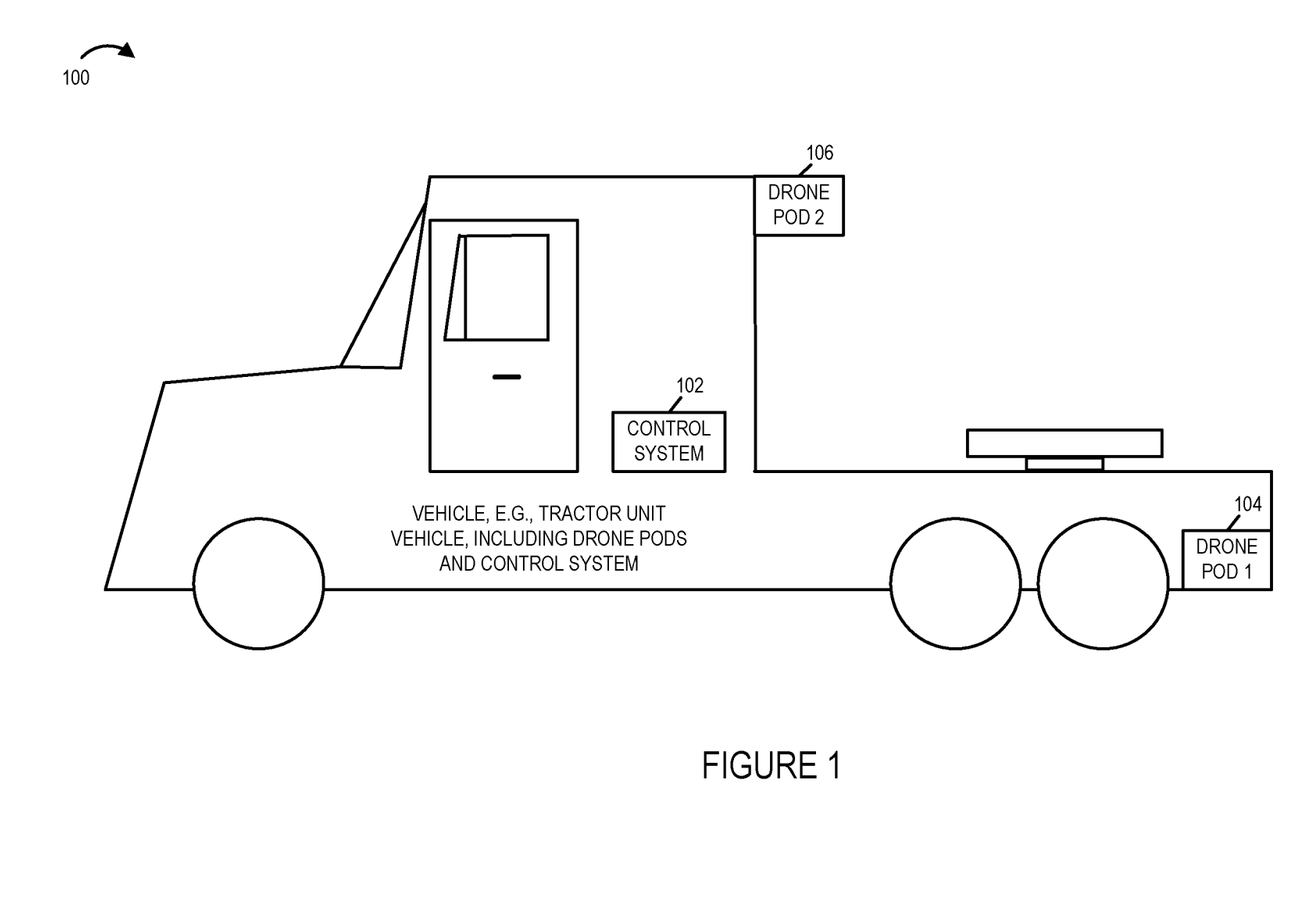
FIG. 1 is a drawing of an exemplary vehicle, e.g., a tractor unit vehicle including a control system and a plurality of drone pods in accordance with an exemplary embodiment.

FIG. 1 is a drawing of an exemplary vehicle 100, e.g., a tractor unit vehicle including a control system 102 and a plurality of drone pods (drone pod 1 104, drone pod 2 104) in accordance with an exemplary embodiment. The exemplary vehicle 100 of FIG. 1 is, e.g., an unmanned tractor unit vehicle of a tractor trailer truck, or a manned tractor unit vehicle of a tractor trailer truck. In some embodiments, the person is the manned tractor unit is a backup driver, e.g., intended to take over control of the vehicle in case of failure by an automated vehicle control system. Drone pod 1 104 includes an unmanned terrestrial vehicle, which may be, and sometimes is deployed. Drone pod 2 106 includes an unmanned aerial vehicle, which may be, and sometimes is deployed. In various embodiments, one or more cameras and/or sensors on a deployed drone are used to obtain and provide information, e.g. a video feed and/or sensor information, to be used as input to assist with control of the vehicle 100.

Figure 2:
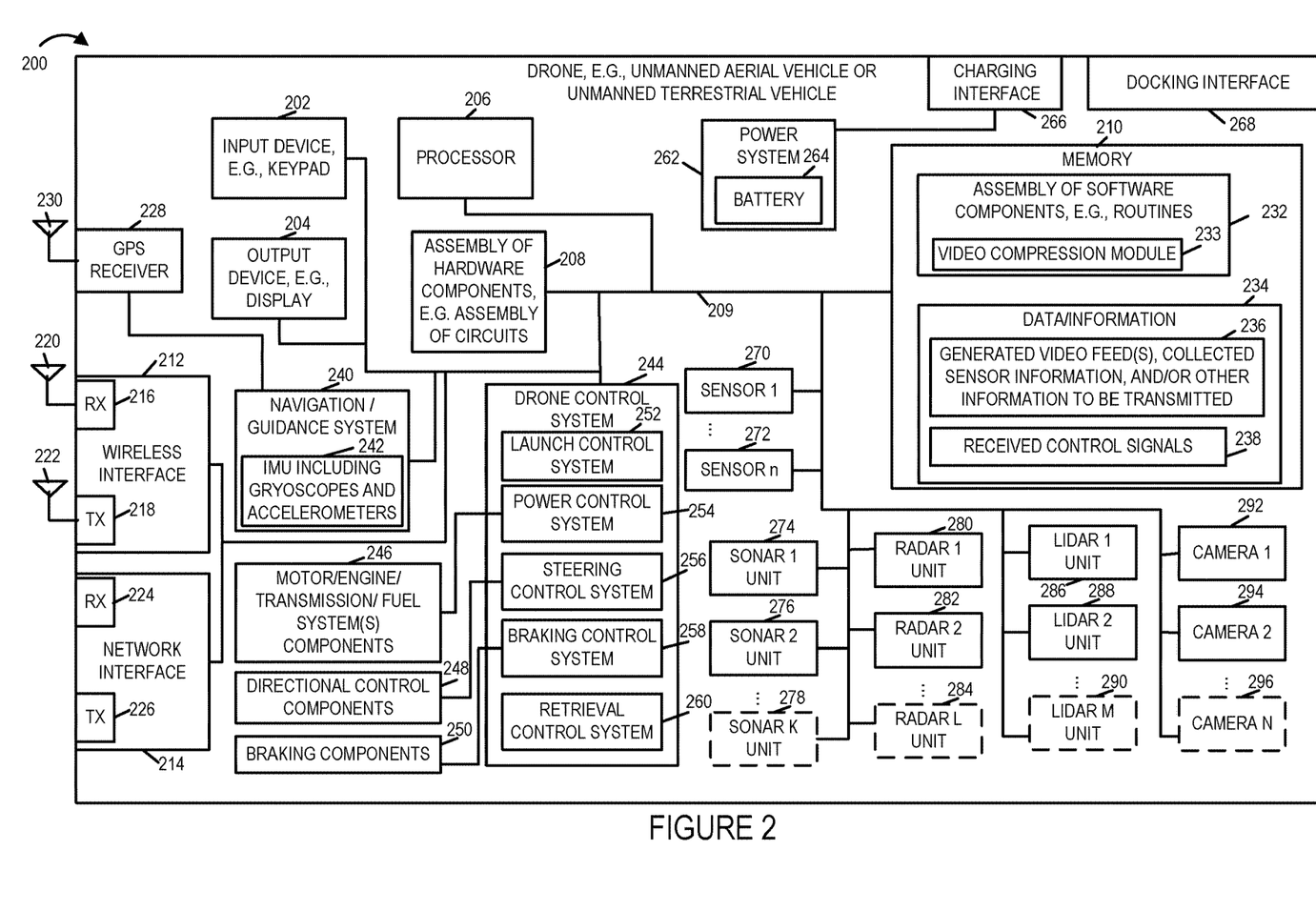
FIG. 2 is a drawing of an exemplary drone, e.g., an unmanned aerial vehicle (UAV) or an unmanned terrestrial vehicle in accordance with an exemplary embodiment.

FIG. 2 is a drawing of an exemplary drone 200, e.g., an unmanned aerial vehicle (UAV) or an unmanned terrestrial vehicle in accordance with an exemplary embodiment. In some embodiments, drone 200 is an unmanned water vehicle. The exemplary drone is, e.g., the drone stored in drone pod 1 104 or the drone stored in drone pod 2 106 of vehicle 100 of FIG. 1. Exemplary drone 200 includes input device(s) 202, an output device(s) 204, a processor 206, e.g., a CPU, an assembly of hardware components 208, e.g., an assembly of circuits, memory 210, a wireless interface 212, a network interface 214, a navigation/guidance system 240, drone control systems 244, a plurality of sensors (sensor 1 270, . . . , sensor n 272), a plurality of sonar units (sonar unit 1 274, sonar unit 2 276, . . . , sonar unit K 278), a plurality of radar units (radar unit 1 280, radar unit 2 282, . . . , radar unit L 284), a plurality of LIDAR units (LIDAR unit 1 286, LIDAR unit 2 288, . . . , LIDAAR unit M 290), and a plurality of cameras (camera 1 292, camera 2 294, . . . , camera N 296) coupled together via a bus 209 over which the various components may interchange data and information.

Input device 202, e.g., a keypad, e.g., a keypad, is used for manually activating/de-activating the drone 200 and/or for providing input when servicing the drone 200. The output device(s) 204 e.g., a display and/or status lights or indicators and/or an audio output device, e.g., alarm, siren, speaker, etc., is used for outputting information, warnings, and/or status indications to an operator or service person. The processor 206, e.g., a CPU, executes routines, e.g., routines loaded into the processor from memory 210 to control the operation of the drone 200. Memory 210 includes assembly of software components 232, e.g., routines, and data/information 234. The assembly of software components 232 includes a video compression module 233. In some embodiments, a component, e.g. a routine, in the assembly of software components 232, when executed by processor 206, implements a step of an exemplary method, e.g. the method of flowchart 600 of FIG. 6. Data/information 234 includes generated video feed(s) to be transmitted and/or collected sensor information to be transmitted 236 and received control signals 238, e.g., a control signal to activate, a control signal to launch the drone, a control signal to re-position the drone, a control signal to collect information, a control signal to send a selected video feed or selected sensor information, a control signal commanding the drone to return to its drone pod on the vehicle, and a control signal to de-activate. The received control signals 238 can be from the vehicle on which the drone is based and/or from a remote control station. The generated video feed and/or sensor information 236 can be, and sometimes is, sent to the vehicle on which the drone is based and/or to a remote control station.

Wireless interface 212 includes a wireless receiver 216 coupled to receive antenna 220 via which the drone receives wireless signals, e.g. control signals, and a wireless transmitter 218 coupled to transmit antenna 222 via which the drone 200 transmits wireless signals, e.g., wireless signals communicating video feeds and/or sensor information. In some embodiments, there is a wireless link between the drone 200 and the vehicle on which it is based. In some embodiments, there may be, and sometimes is, a wireless link between the drone 200 and a wireless base station, which is coupled, e.g., via a backhaul network, to a remote control station. Network interface 214 includes a receiver 224 and a transmitter 226, via which the drone 200 communicates, in some embodiments, with the vehicle on which it is based while it is docked on the vehicle.

Drone 200 further includes a docking interface 268, e.g., for securing the drone 200 on the vehicle, e.g., vehicle 100, on which it is based and a charging interface 266 for receiving power from the base vehicle, e.g., vehicle 100, to recharge the battery 264 included as part of the power system 262 of drone 200. In some embodiments, the charging interface 266 is included as part of network interface 214.

Drone 200 further includes an embedded GPS receiver 228 coupled to GPS antenna 230, which receives GPS signals and determines time information, a position fix, e.g., latitude/longitude/altitude, and/or velocity information for the drone 200. The output of GPS receiver 228 is fed as input to navigation/guidance system 240. Navigation/guidance system 240 includes an inertial measurement unit (IMU) 242, e.g., an IMU on a chip, including gyroscopes and accelerometers. Navigation/guidance system 240, provides filtered location, attitude, acceleration and/or velocity information, and is used to route the drone along an intended path.

Drone control systems 244 include a launch control system 252, a power control system 254, a steering control system 256, a braking control system 258, and a retrieval control system 260. Launch control system 252 is used to control launch of drone 200 from its base vehicle, e.g., vehicle 100. Power control system 254 is coupled to motor/engine/transmission/fuel system(s) 246, included in drone 200, and is used to control motion of the drone, e.g. forward, reverse, speed, up, down, etc., when the drone is separated from its base vehicle. Steering control system 256 is coupled to directional control components 248, e.g. steering linkages, actuators for control surfaces, etc., and is used to control the direction of the drone when the drone is separated from its base vehicle. Braking control system 258 is coupled to braking components 250, e.g., brake actuators, brake cables, etc., included in drone 200 and is used to control braking of the drone 200. Retrieval control system 260 is used to control retrieval and docking of the drone 200 to its drone pod on its base vehicle. Sensors (270, . . . , 272) include, e.g. speed sensors, motion sensors, proximity sensors, etc., and collect information which is reported by the drone 200. Sonar units (274, 276, . . . , 278) are used to perform distance measurements to other objects in the vicinity of the drone 200. Radar units (280, 282, . . . , 290) are used to detect and measure the speed of other objects in the vicinity of the drone 200. Light detection and ranging (LIDAR) units (286, 288, . . . 290) use lasers to detect and range objects in the vicinity of the drone 200. Cameras (292, 294, . . . 296), e.g., which are mounted and oriented on the drone 200 to capture different fields of view, capture images, e.g. video feeds, which are streamed, e.g. selectively streamed, to a the base vehicle and/or a remote station, e.g. to provide assistance in moving or re-positioning the base vehicle, e.g. provide assistance to an automated vehicle control system when backing up and/or repositioning the base vehicle, e.g., vehicle 100, in a very tight spot.

In some embodiments, drone 200 is a low cost device including one or a few cameras and does not includes sonar, radar or LIDAR units. In some embodiments, drone 200 includes a single camera with a plurality of optical chains.

Figure 3:
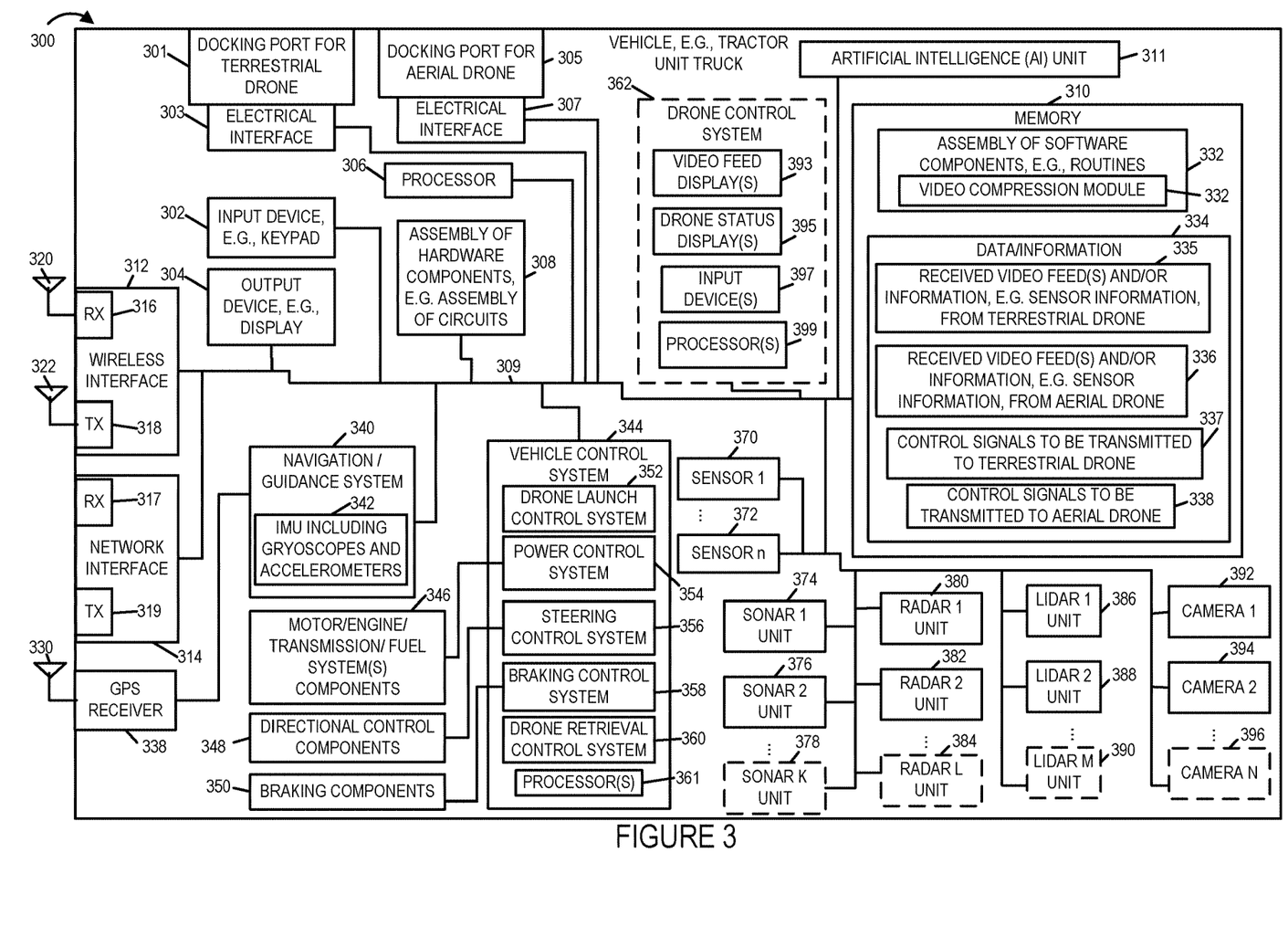
FIG. 3 is a drawing of an exemplary vehicle, e.g., a tractor unit truck, in accordance with an exemplary embodiment.

FIG. 3 is a drawing of an exemplary vehicle 300, e.g., a tractor unit truck, in accordance with an exemplary embodiment. Exemplary vehicle 300 of FIG. 3 is, e.g., the vehicle 100 of FIG. 1. Vehicle 300 includes an input device 302, an output device 304, a processor 306, an assembly of hardware components 308, e.g., an assembly of circuits, memory 310, a wireless interface 312, a network interface 314, a navigation/guidance system 340, a vehicle control system 344, a drone control system 362, a plurality of sensors (sensor 1 370, . . . , sensor n 372), a plurality of sonar units (sonar unit 1 374, sonar unit 2 376, . . . , sonar unit K 378), a plurality of radar units (radar unit 1 380, radar unit 2 382, . . . , radar unit L 384), a plurality of LIDAR units (LIDAR unit 1 386, LIDAR unit 2 388, . . . , LIDAR unit M 390), a plurality of cameras (camera 1 392, camera 2 394, . . . , camera N 396), and an artificial intelligence (AI) unit 311 coupled together via bus 309 over which the various elements may interchange data and information.

Input device 302, e.g., a keypad is used for receiving manual input, e.g. from an operator of vehicle 300, vehicle monitoring individual, or service person, e.g., to control the vehicle 300 and/or to control one or more drones. The output device(s) 304 e.g., a display and/or status lights or indicators and/or an audio output device, e.g., alarm, siren, speaker, etc., is used for outputting information, warnings, and/or status indications to an operator of the vehicle 300, a vehicle monitoring individual, or a vehicle service person. The processor 306, e.g., a CPU, executes routines, e.g., routines loaded into the processor 306 from memory 310 to control the operation of the vehicle 300. Memory 310 includes assembly of software components 332, e.g., routines, and data/information 334. In some embodiments, a component, e.g. a routine, in the assembly of software components 332, when executed by processor 306, 399, or 361, implements a step of an exemplary method, e.g. the method of flowchart 600 of FIG. 6. The assembly of software components 332 includes a video compression module 333. Data/information 334 includes received video feed(s) and/or information, e.g., sensor information, from a terrestrial drone 335, received video feed(s) and/or information, e.g., sensor information, from an aerial drone 336, control signals to be transmitted to a terrestrial drone 337 and control signals to be transmitted to an aerial drone 338.

Wireless interface 312 includes a wireless receiver 316 coupled to receive antenna 320 via which the vehicle 300 receives wireless signals, e.g. wireless signals communicating video feeds and/or sensor information from a drone and/or wireless signals, communicating control information, from a base station coupled to a remote control station, and a wireless transmitter 318 coupled to transmit antenna 322 via which the vehicle 300 transmits wireless signals, e.g., wireless control signals to a drone and/or wireless signals to a base station communicating video feeds and/or sensor information to be delivered to a remote control station. In some embodiments, there is a wireless link between a drone, based on vehicle 300 and the vehicle 300, when the drone is launched from vehicle 300. In some embodiments, there may be, and sometimes is, a wireless communications link between vehicle 300 and a base station, e.g. a cellular base station. Network interface 314 includes a receiver 317 and a transmitter 319, via which the vehicle 300 communicates with communicates with test equipment and/or which is used to configure the vehicle 300, e.g., when the vehicle is parked, e.g., at a depot, garage, and/or service, repair and/or maintenance facility.

Vehicle 300 further includes a docking port for a terrestrial drone 310, e.g., for securing the terrestrial drone to vehicle 300 and an electrical interface 303, e.g., for communicating with the terrestrial drone while docked and/or for charging the battery included in the terrestrial drone. In some embodiments, the charging interface is separate from the communications interface. Vehicle 300 further includes a docking port for the aerial drone 305, e.g., for securing the aerial drone to vehicle 300 and an electrical interface 307, e.g., for communicating with the aerial drone while docked and/or for charging the battery included in the aerial drone. In some embodiments, the charging interface is separate from the communications interface.

Vehicle 300 further includes an embedded GPS receiver 338 coupled to GPS antenna 330, which receives GPS signals and determines time information, a position fix, e.g., latitude/longitude/altitude, and/or velocity information for the vehicle 300. The output of GPS receiver 338 is fed as input to navigation/guidance system 340. Navigation/guidance system 340 includes an inertial measurement unit (IMU) 342, e.g., an IMU on a chip, including gyroscopes and accelerometers. Navigation/guidance system 340, provides filtered location, attitude, acceleration and/or velocity information, and is used to route the vehicle along an intended path.

Vehicle control system 344 includes a drone launch control system 352, a power control system 354, a steering control system 356, a braking control system 358, a drone retrieval control system 360, and processor(s) 361. Launch control system 352 is used to control launch of the terrestrial and aerial drones from vehicle 300. Power control systems 354 is coupled to motor/engine/transmission/fuel system(s) 346, included in vehicle 300, and is used to control motion of the vehicle 300, e.g. forward, reverse, speed, acceleration, deceleration, etc. Steering control system 356 is coupled to directional control components 348, e.g. steering motors, steering linkages, rack and pinion, gear box, etc., and is used to control the direction of vehicle 300. Braking control system 358 is coupled to braking components 350, e.g., brake actuators, brake cables, wheel speed sensors, wheel motors, ABS system components, etc., included in vehicle 300 and is used to control braking of the vehicle 300. Drone retrieval control system 360 is used to control retrieval and docking of a drone to its drone pod on vehicle 300. In some embodiments, processor 306 is used by vehicle control system 344 in place of or in addition to processor(s) 361.

Sensors (370, . . . , 372) include, e.g. speed sensors, motion sensors, proximity sensors, etc., and collect information used to control vehicle 300. Sonar units (374, 376, . . . , 378) are used to perform distance measurements to other objects in the vicinity of the vehicle 300. Radar units (380, 382, . . . , 390) are used to detect and measure the speed of other objects in the vicinity of the vehicle 300. Light detection and ranging (LIDAR) units (386, 388, . . . , 390) use lasers to detect and range objects in the vicinity of the vehicle 300. Cameras (392, 394, . . . 396), e.g., which are mounted and oriented on the vehicle 300 to capture different fields of view, capture images, e.g. video feeds, which are streamed, e.g. selectively streamed, to a remote station, and/or are used to provide assistance in moving or re-positioning the vehicle 300, e.g. provide assistance to an automated or assisted vehicle driving control system.

Drone control system 362, included in some embodiments, includes one or more video feed displays 393 for displaying video feeds from drones which have been launched, drone status display(s) 395 for providing status on the terrestrial and aerial drones, input device(s) 397, e.g. keypad, touchscreen, joystick, etc., for receiving user input to control a drone, and one or more processor(s) 399, e.g., for controlling a drone or drones. In some embodiments, drone control system 362 controls one or more drones without user input, e.g., with assistance from artificial intelligence unit 311. In some embodiments, drone control system 362 controls one or more drones with some user input, e.g., entered via an individual, e.g., a back up driver or monitoring individual on vehicle 300 or entered via an individual at a remote control station at a different location from the location of vehicle 300. In some embodiments, processor 306 is used by drone control system 362 in place of or in addition to processor(s) 399.

In some embodiments, in which vehicle 300 of FIG. 3 is vehicle 100 of FIG. 1 vehicle controls systems 344, drone control systems 362 and AI unit 311 are included as part of control system 102.

In some embodiments, vehicle 300 is a water vehicle, a boat or ship, and the vehicle includes docking ports for water drones and aerial drones.

Figure 4:
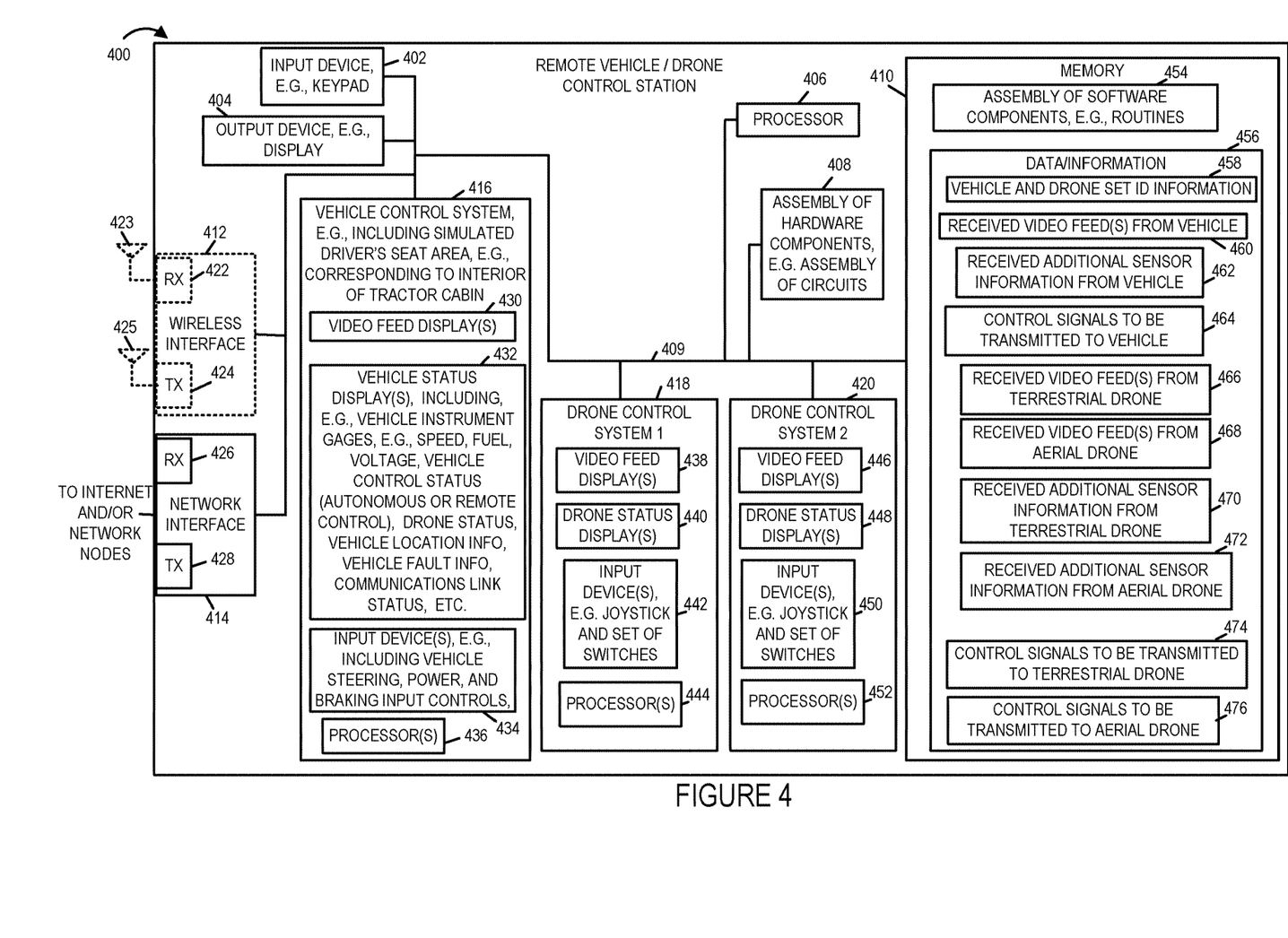
FIG. 4 is a drawing of an exemplary remote vehicle/drone control station in accordance with an exemplary embodiment.

FIG. 4 is a drawing of an exemplary remote vehicle/drone control station 400 in accordance with an exemplary embodiment. Exemplary vehicle/drone control station 400 is, e.g., one of remote/vehicle control stations (502, 504) of FIG. 5. Vehicle/drone control station 400 includes an input device, e.g. a keyboard, an output device 404, e.g., a display, a processor 406, e.g., a CPU, an assembly of hardware components 408, e.g., and assembly of circuits, memory 410, a wireless interface 412, a network interface 414, a vehicle control system 416, e.g., for controlling and/or monitoring a vehicle such vehicle 300 or vehicle 100, drone control system 1 418, e.g., for controlling and/or monitoring a terrestrial drone, drone control system 2 420, e.g. for controlling and/or monitoring an aerial drone, coupled together via a bus 409 over which the various elements may interchange data and information.

Memory 410 includes an assembly of software components 454, e.g., routines, and data/information 456. In some embodiments, a component, e.g. a routine, in the assembly of software components 454, when executed by processor 406, implements a step of an exemplary method, e.g. the method of flowchart 600 of FIG. 6. Data/information 456 includes vehicle and drone set ID information 458, e.g., an ID for the vehicle, and ID for the vehicle terrestrial drone, and an ID for the vehicle's aerial drone, received video feed(s) from vehicle 460, received additional sensor information from vehicle 462, control signals to be transmitted to vehicle 464, received video feed(s) from terrestrial drone 466, received video feed(s) from aerial drone 468, received additional sensor information from terrestrial drone 470, received additional sensor information from aerial drone 472, control signals to be transmitted to terrestrial drone 474, and control signals to be transmitted to aerial drone 476.

Wireless interface 412, which is included in some embodiments, includes a wireless receiver 422 coupled to receive antenna via which remote control station 400 receives wireless signals, and a wireless transmitter 424 coupled to transmit antenna 425 via which the remote control station 400 transmits wireless signals.

Network interface 414 includes a receiver 426, via which the remote control station 400 receives signals, e.g. via the Internet and/or a backhaul network, originally sourced from a vehicle or drone, e.g. signals communicating a video feed(s) and/or sensor information. Network interface 414 further includes a transmitter 428, via which the remote control station 400 transmits signal, e.g. control signals, via the Internet and/or network nodes of a backhaul network, to a base station, said base station to communicate the control signals to a vehicle and/or a drone which is to implement the commands.

Vehicle control system 416, e.g., including a simulated driver's seat area, e.g., corresponding to an interior of tractor cabin for vehicle 300 or vehicle 100, includes video feed display(s) 430 for display streamed video feeds from cameras included in the vehicle, vehicle status display(s) 432, including, e.g., vehicle instrument gages, e.g., speed, fuel, voltage, vehicle control status, e.g., autonomous or remote control, drone status, vehicle location information, vehicle fault information, communications link status, etc. Vehicle control system 416 further includes input device(s) 434, e.g., including vehicle steering, direction, power and braking control input controls, e.g., a steering wheel with input rotary position sensor, a gearshift with forward reverse direction sensors, an accelerator pedal with a sensor, and a brake pedal with a sensor, and one or more processors 436.

Drone control system 1 418 includes video feed display(s) 438 for displaying streamed video feeds from cameras of the terrestrial drone, drone status display(s) 440, e.g., for displaying current status of the terrestrial drone, e.g., docked, deployed, active, inactive, no failures, failures detected, current drone position, current drone position with respect to base vehicle, moving, stationary, etc., input device(s) 442, e.g., a joystick and a set of switches for controlling the terrestrial drone, e.g., when deployed, and one or more processors 444.

Drone control system 2 420 includes video feed display(s) 446 for displaying streamed video feeds from cameras of the aerial drone, drone status display(s) 448, e.g., for displaying current status of the aerial drone, e.g., docked, deployed, active, inactive, no failures, failures detected, current drone position, current drone position with respect to base vehicle, moving, stationary, etc., input device(s) 450, e.g., a joystick and a set of switches for controlling the aerial drone, e.g., when deployed, and one or more processors 452.

In some embodiments, remote vehicle/drone control station 400 is capable of controlling multiple vehicles each with multiple drones simultaneously and includes multiple sets of vehicle control system 416, drone control system 1 418 and drone control system 2 420.

Figure 5:
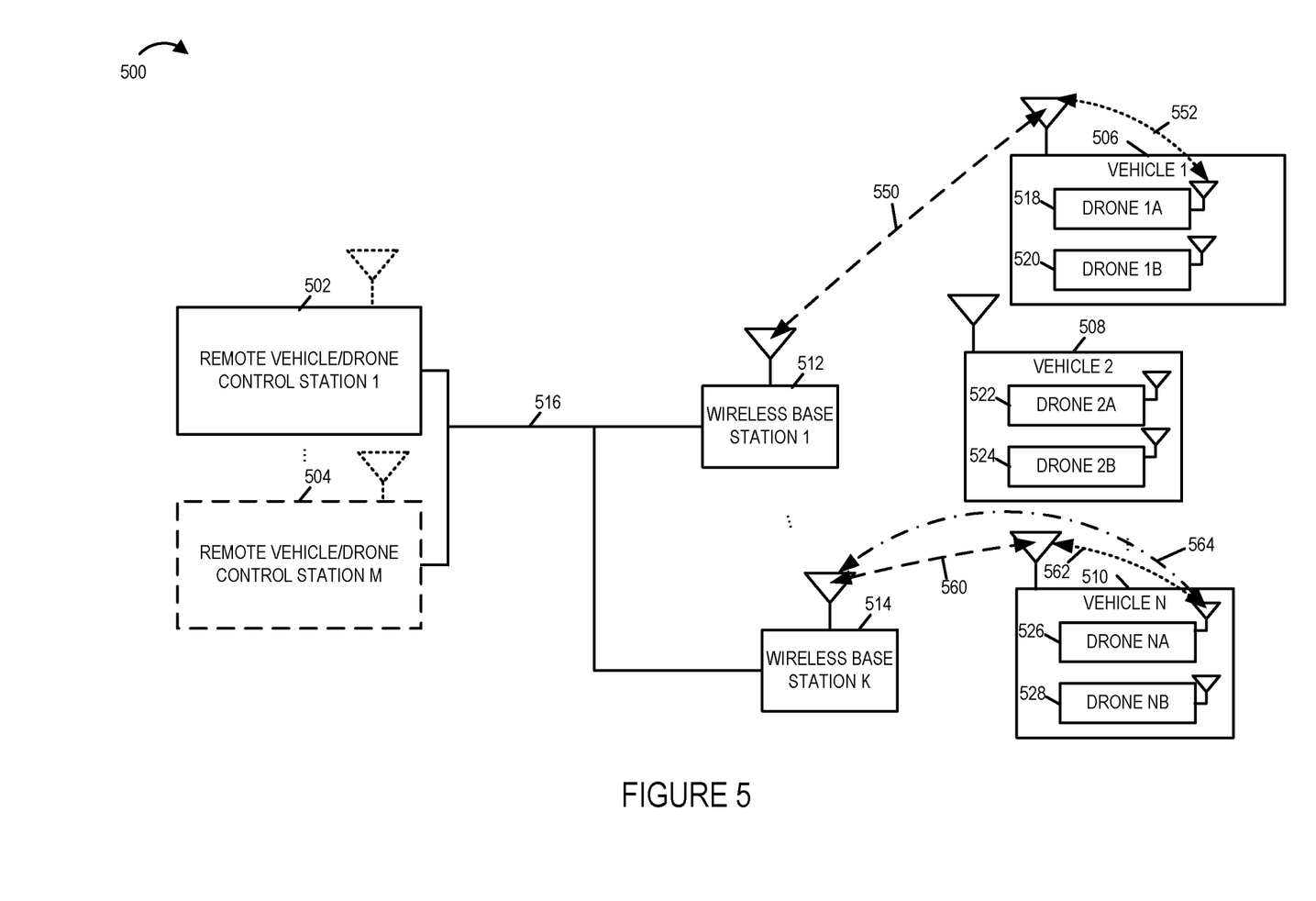
FIG. 5 is a drawing of an exemplary system including a plurality of vehicles, a plurality of wireless base stations, and one or more remote vehicle/drone control stations, in accordance with an exemplary embodiment.

FIG. 5 is a drawing of an exemplary system 500 including a plurality of vehicles (vehicle 1 506, vehicle 2 508, . . . , vehicle N 510), a plurality of wireless base stations (wireless base station 1 512, . . . , wireless base station K 514), and one or more remote vehicle/drone control stations (remote vehicle/drone control station 1 502, . . . , remote vehicle/drone control station M 504), in accordance with an exemplary embodiment. Each of the vehicles (506, 508, . . . , 510) includes 2 drones, which may be, and sometimes are, deployed. Vehicle 1 506 includes drone 1A 518, e.g., a terrestrial drone, and drone 1B 520, e.g., an aerial drone. Vehicle 2 508 includes drone 2A 522, e.g., a terrestrial drone, and drone 2B 524, e.g., an aerial drone. Vehicle N 510 includes drone NA 526, e.g., a terrestrial drone, and drone NB 528, e.g., an aerial drone. In some embodiments, each of the drones (518, 520, 522, 524, 526, 528) are implemented in accordance with exemplary drone 200 of FIG. 2. In some embodiments each of the vehicles (506, 508, 510) are implemented in accordance with vehicle 100 of FIG. 1 and/or vehicle 300 of FIG. 3. In some embodiments, each of the remote vehicle/drone control stations (502, 504) are implemented in accordance with exemplary control station 400 of FIG. 4.

Dotted line 552 represents a wireless communications link between drone 1A 518 and vehicle 1 506, which is its base vehicle. Dashed line 550 represents a wireless communications link between vehicle 1 506 and wireless base station 1 512, e.g., a cellular base station. In this example, if deployed drone 1A 518 sends a captured image to a remote vehicle/drone control station, e.g., station 1 502, the captured image is communicated via wireless link 552 and via wireless link 550 and then via the backhaul 516 to remote vehicle/drone control station 1 502.

In some embodiments, wireless communications link 552 corresponds to a short range communications protocol and communications link 550 corresponds to a long range communications protocol.

Dotted line 562 represents a wireless communications link between drone NA 564 and vehicle N 562, which is its base vehicle. Dashed line 560 represents a wireless communications link between vehicle N 510 and wireless base station K 514, e.g., a cellular base station. Dash/dot line 564 represents a wireless communications link between drone NA 564 and wireless base station K 514. In this example, if deployed drone NA 526 sends a captured image to a remote vehicle/drone control station, e.g., station N 504, the captured image is communicated via wireless link 564 and then via the backhaul 516 to remote vehicle/drone control station M 504.

In some embodiments, vehicles and/or drones may, and sometimes do, communicate directly with a remote vehicle/drone control station via a wireless link, e.g., bypassing the wireless base station and backhaul network.

Figure 6:
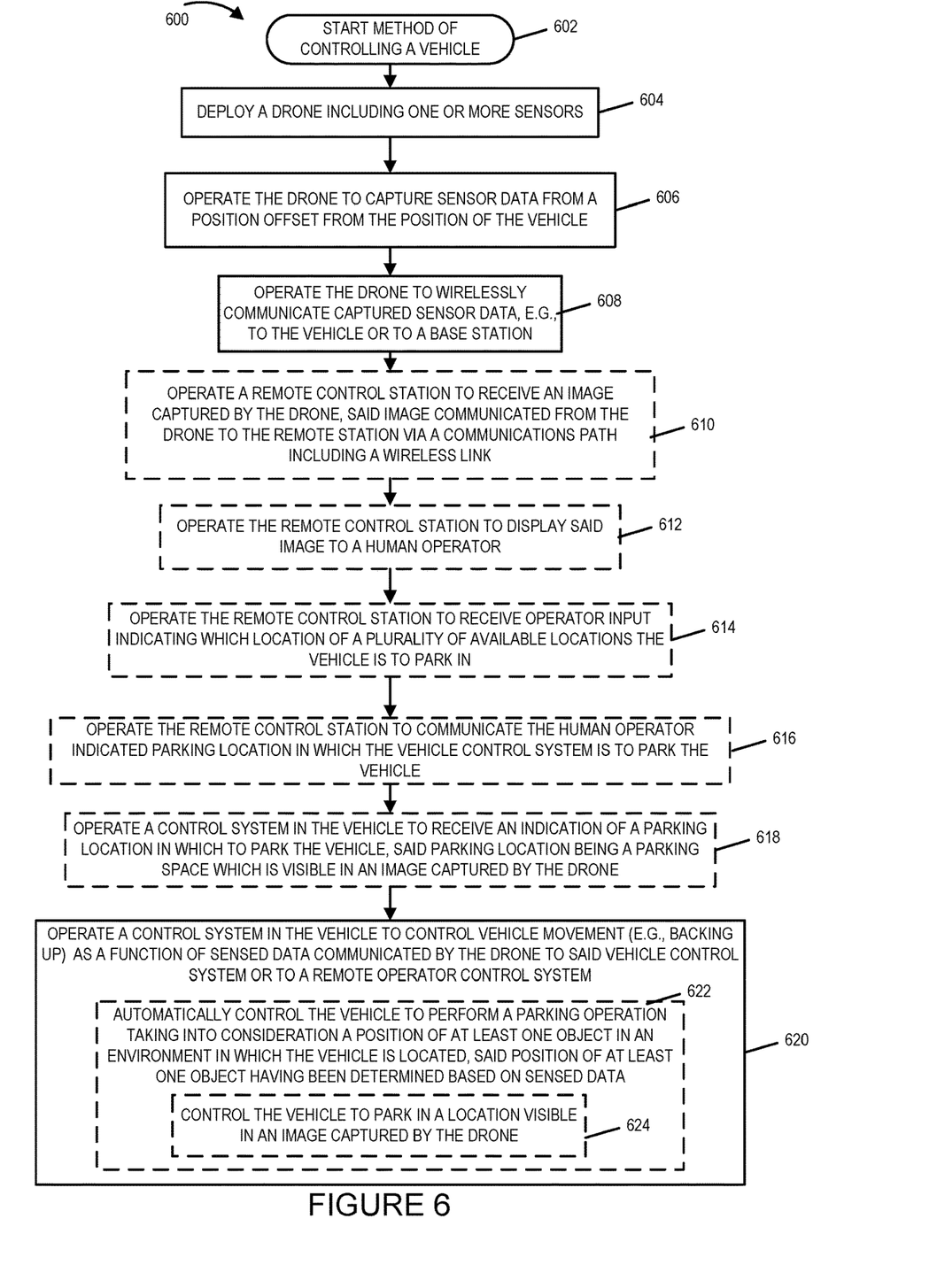
FIG. 6 is a flowchart of an exemplary method of controlling a vehicle in accordance with an exemplary embodiment.

FIG. 6 is a flowchart 600 of an exemplary method of controlling a vehicle, e.g., vehicle 100 of FIG. 1, vehicle 300 of FIG. 3 or any of vehicles (506, 508, 510) of FIG. 5, in accordance with an exemplary embodiment. Operation starts in step 602 and proceeds to step 604.

In step 604 the vehicle is operated to deploy a drone, e.g., drone 200 of FIG. 2, or any of drones (518, 520, 522, 524, 526, 528) of FIG. 5, including one or more sensors. In the case of a wheel drone deploying the drone includes, e.g., undocking the drone and lowering the drone to ground. In the case of a flying drone such as a battery powered helicopter deploying the drone includes undocking the drone and performing a liftoff or aerial launch operation. Exemplary sensors include, e.g. one or more cameras. In some embodiments, the one or more cameras include a first camera and a second camera, a lens of the second camera being spaced apart from a lens of the first cameras by a distance D. In some embodiments, the cameras are part of a camera array. In some embodiments, a camera includes a plurality of optical chains. In some embodiments, different types of exemplary sensors, such as, e.g., a radar and/or a LIDAR device, may be, and sometimes are, included in addition to or as alterative to the cameras. Operation proceeds from step 604 to step 606.

In step 606 the drone is operated to capture sensor data from a position offset from the position of the vehicle. Operation proceeds from step 606 to step 608.

In step 608 the drone is operated to wirelessly communicate captured sensor data, e.g., to the vehicle or to a base station. For example, one or more captured images may be included in a communicated video feed and/or radar information and/or LIDAR information such as measured distances or information used to determine distances to objects is communicated. Operation proceeds from step 608 to step 610.

In step 610 a remote control station, e.g., remote control station 400 of FIG. 4 or any of remote control stations (502, 504) of FIG. 5, is operated to receive an image captured by the drone, said image communicated from the drone to the remote station via a communications path including at least one wireless link. Operation proceeds from step 610 to step 612.

In step 612 the remote control station is operated to display said image to a human operator. Operation proceeds from step 612 to step 614.

In step 614 the remote control station is operated to receive operator input indicating which location of a plurality of available locations the vehicle is to park in. Operation proceeds from step 614 to step 616.

In step 616 the remote control station communicates the human operator indicated parking location in which the vehicle control system is to park the vehicle. Operation proceeds from step 616 to step 618.

In step 618 a control system, e.g., control system 102 or vehicle control system 344, in the vehicle receives an indication of a parking location in which to park the vehicle, said parking location being a parking space which is visible in an image captured by the drone. Operation proceeds from step 618 to step 620.

In step 620 the control system, e.g. control system 102 or vehicle control system 344, in the vehicle controls vehicle movement (e.g., a backing up) as a function of sensed data communicated by the drone to the vehicle control system or to a remote operator control system. In some embodiments, the control system in the vehicle includes a processor, e.g., processor 361, for automatically controlling the vehicle to maneuver, e.g. e.g., as part of a paring operation. Step 620 includes step 622 in which the vehicle control system automatically controls the vehicle to perform a paring operation taking into consideration a position of at least one object in an environment in which the vehicle is located, said position of at least one object having been determined based on sensed data. Step 622 includes step 624 in which the vehicle control system controls the vehicle to park in allocation visible in an image captured by the drone.

Various aspects and/or features related to remote monitor and remote operator, e.g., of a vehicle, will be described below. Maneuvering a vehicle in places such as gas stations or complex construction zones or tiny streets in city centers is difficult for autonomous systems.

In some embodiments, autonomous vehicles, e.g., in a fleet of trucks or taxis, are fitted with hardware that allows for remote operators to monitor vehicle sensors (primarily video) in real time and also operate the vehicle controls.

In some embodiments, the AI in the vehicle can be, and in some embodiments is, trained to detect situations it cannot handle, and then contact the remote driver for help. Alternatively, in some embodiments, remote operators would constantly monitor the vehicles in the fleet and intervene when necessary.

The bandwidth of the video uplink may be a problem. However, since any complicated maneuvering should be performed at low speeds, this may not be a major issue. In some embodiments, the video feed from the on-board cameras will be compressed and transmitted via a LTE or 5G connection.

In addition to video, other sensor data can be, and sometimes is, transmitted to the remote operators. In some embodiments, the use of the remote operators is to provide on-line training data for difficult traffic situations.

Various aspects and/or features related to drone/remote controlled vehicle for safe backing of semi trucks is described below. Backing up a tractor+trailer is extremely difficult due to the huge blind spots.

In some cases it is not practical to fit trailers with cameras and other sensors because the trailers (as opposed to the tractors) belong to customers and are frequently switched. Attaching a wireless camera or other temporary sensor may pose difficult calibration problems. That means that most or all the hardware used for Advanced Driver Assistance Systems (ADAS) has to be stored in the tractor. In some embodiments, a flying drone equipped with a camera is stored in the tractor. The drone will be released whenever the truck has to backup, or in any other situation where a slow speed maneuver that benefits from a birds eye view is necessary. The video stream from the drone will be used by the AI in the truck for performing a safe back up maneuver.

In case flying a drone is not possible due to weather or insufficient headroom or legal restrictions, in some embodiments a small wheeled radio controlled car is included and used for providing a video feed behind the truck. This remote 'toy car' can act as a remote sensor and/or pilot for the big truck, effectively guiding it through a complex environment by providing video and/or other information that can be used to control or facilitate maneuvering of the truck or other vehicle.

NUMBERED LIST OF EXEMPLARY METHOD EMBODIMENTS

Method Embodiment 1 A method of controlling a vehicle (100 or 300 or 506 or 508 or 510) the method comprising: deploying (604) (e.g. lowering to the ground in the case of a wheeled vehicle or lifting off in the case of a flying drone such as a battery powered helicopter) a drone including one or more sensors (e.g., including one or more cameras with the cameras in some cases being part of an array of cameras including a first camera and a second camera, a lens of the second camera being spaced apart from a lens of the first camera by a distance D (sometimes a single camera includes a plurality of optical chains) and/or the sensors including a radar or LIDAR device in addition to or as an alternative to the cameras); operating (606) the drone to capture sensor data from a position offset from the position of the vehicle; and operating (608) the drone to wirelessly communicate captured sensor data (e.g., one or more images such as may be included in a communicated video feed and/or radar and/or LIDAR information such as measured distances or information used to determine distances to objects) (e.g., to the vehicle or to a wireless base station).

Method Embodiment 2 The method of Method Embodiment 1, further comprising: operating (620) a control system (102 or 344) in the vehicle to control vehicle movement (e.g., backing up) as a function of sensed data communicated by said drone to said vehicle control system or to a remote operator control system.

Method Embodiment 3 The method of Method Embodiment 2, wherein said control system (102 or 344) automatically controls (622) the vehicle to perform a parking operation taking into consideration a position of at least one object in an environment in which the vehicle is located, said position of the at least one object having been determined based on the sensed data.

Method Embodiment 4 The method of Method Embodiment 3, wherein said control system (102 or 344) includes a processor (361) for automatically controlling said vehicle to maneuver (e.g., as part of said parking operation).

Method Embodiment 5 The method of Method Embodiment 3, wherein automatically controlling (622) the vehicle to perform a parking operation includes: controlling (624) said vehicle to park in a location visible in an image captured by said drone.

Method Embodiment 6 The method of Method Embodiment 5, further comprising: operating (618) the control system (102 or 344) to receive from a remote control station (400 or 502 or 504) an indication of a parking location in which to park said vehicle, said parking location being a parking space, e.g., spot, which is visible in an image captured by said drone.

Method Embodiment 7 The method of Method Embodiment 6, further comprising: operating (610) the remote control station (400 or 502 or 504) to receive said image captured by said drone said image communicated from the drone via a communications path including a wireless link (e.g., the communications path between the drone and the remote control station includes wireless links 552 and 550 for a case in which the drone only communicates with its base vehicle using a short range wireless link or the communications path between the drone and the remote control station includes wireless link 564 for a case in which the drone can communicate wirelessly with both its base vehicle and a wireless base station); operating (612) the remote control station to display said image to a human operator; operating (614) the remote control station to receive operator input indicating which location of a plurality of available location the vehicle is to park in; and operating (616) the remote control station to communicate (e.g., via a communication path including a wireless link) the human operator indicated parking location in which the vehicle control system is to park the vehicle (e.g., to the vehicle control system of the vehicle).

EXEMPLARY NUMBERED SYSTEM EMBODIMENTS

Numbered system embodiment 10. A system for controlling a vehicle (300), the system comprising:
 a drone (200) including one or more sensors; a drone control system (362) including a processor (399) for the drone (200) deploying the drone (200); capture sensor data from a position offset from the position of the vehicle; and operate the drone (200) to wirelessly communicate captured sensor data.

Numbered system embodiment 11. The system of numbered embodiment 10, further comprising: a vehicle control system (344 or 502) configured to control vehicle movement as a function of sensed data communicated by said drone to said vehicle control system or to a remote operator control system.

Numbered system embodiment 12. The system of numbered embodiment 11, wherein said control system (344 or 502) automatically controls the vehicle (300) to perform a parking operation taking into consideration a position of at least one object in an environment in which the vehicle is located, said position of the at least one object having been determined based on the sensed data.

Numbered system embodiment 13. The system of numbered embodiment claim 12, wherein said control system includes a processor (361) for automatically controlling said vehicle to maneuver.

Numbered system embodiment 14. The system of numbered embodiment 12, wherein automatically controlling the vehicle to perform a parking operation includes: controlling said vehicle to park in a location visible in an image captured by said drone.

Numbered system embodiment 15. The system of numbered embodiment 14, further comprising: a wireless interface (312) located in said vehicle (300) the wireless interface being configured to receive from a remote control station (502) an indication of a parking location in which to park said vehicle (300), said parking location being a parking space which is visible in an image captured by said drone.

Numbered system embodiment 16. The system of numbered embodiment 15, wherein the processor (399) in the drone control system (362) is configured to control the drone to communicate to the remote control station (502) said image captured by said drone via a communications path including a wireless link; and wherein the system further includes a remote control station (400), said remote control station including a processor (406) configured to control the remote control station to: display said image to a human operator; receive operator input indicating which location of a plurality of available location the vehicle is to park in; and communicate the human operator indicated parking location in which the vehicle control system is to park the vehicle.

Numbered system embodiment 17. The system of numbered embodiment 11, wherein said vehicle is a truck with a drone pod for storing said drone.

Numbered system embodiment 18. The method of numbered embodiment 17, wherein said truck is a tractor unit for pulling a trailer, the truck and trailer in combination forming a tractor trailer.

Exemplary Numbered Computer Readable Medium Embodiment

Numbered Embodiment 19. A non-transitory computer readable medium including processor executable instructions which when executed by one or more processes control a system to: deploy a drone including one or more sensors; operate the drone to capture sensor data from a position offset from the position of the vehicle; and operate the drone to wirelessly communicate captured sensor data.

It should be appreciated that while a tractor unit of a tractor trailer is shown as the exemplary vehicle in various embodiments the vehicle is a truck, car, or other type of moveable vehicle. The vehicle may and sometimes does include, in addition to the truck or tractor unit, the trailer pulled by the tractor portion of the tractor trailer combination. In some but not all embodiments the vehicle is a completely unmanned vehicle. In some such embodiments the vehicle does not include space or a compartment for a human operator to sit or remain in the vehicle while the vehicle is being used to pull a trailer or transport goods.

In some embodiments the single processor 306 serves as the processor 399 and processor 361 as well as processor 399 avoiding the need for multiple separate processors.

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, implemented using a variety of wireless communications technologies such as CDMA, orthogonal frequency division multiplexing (OFDM), WiFi, and/or various other types of communications techniques which may be used to provide wireless communications links.

Some aspects and/or features are directed a non-transitory computer readable medium embodying a set of software instructions, e.g., computer executable instructions, for controlling a computer or other device, e.g., a vehicle such as a tractor unit truck or a drone or a remote control station, to operate in accordance with the above discussed methods.

The techniques of various embodiments may be implemented using software, hardware and/or a combination of software and hardware. Various embodiments are directed to a control apparatus, e.g., controller or control system, which can be implemented using a microprocessor including a CPU, memory and one or more stored instructions for controlling a device or apparatus to implement one or more of the above described steps. Various embodiments are also directed to methods, e.g., a method of controlling a vehicle or drone or remote control station and/or performing one or more of the other operations described in the present application. Various embodiments are also directed to a non-transitory machine, e.g., computer, readable medium, e.g., ROM, RAM, CDs, hard discs, etc., which include machine readable instructions for controlling a machine to implement one or more steps of a method.

As discussed above various features of the present invention are implemented using modules and/or components. Such modules and/or components may, and in some embodiments are, implemented as software modules and/or software components. In other embodiments the modules and/or components are implemented in hardware. In still other embodiments the modules and/or components are implemented using a combination of software and hardware. In some embodiments the modules and/or components are implemented as individual circuits with each module and/or component being implemented as a circuit for performing the function to which the module and/or component corresponds. A wide variety of embodiments are contemplated including some embodiments where different modules and/or components are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

The techniques of the present invention may be implemented using software, hardware and/or a combination of software and hardware. The present invention is directed to apparatus, e.g., a vehicle which implements one or more of the steps of the present invention. The present invention is also directed to machine readable medium, e.g., ROM, RAM, CDs, hard discs, etc., which include machine readable instructions for controlling a machine to implement one or more steps in accordance with the present invention.

Numerous additional variations on the methods and apparatus of the various embodiments described above will be apparent to those skilled in the art in view of the above description. Such variations are to be considered within the scope.

What is claimed is:

1. A method of controlling a vehicle, the method comprising:
storing a first drone on the vehicle in a first storage location, wherein said vehicle is a truck and wherein said first storage location is a first drone pod located on a bottom portion of said truck, said truck being a wheeled vehicle in the form of a tractor unit for pulling a trailer, the truck and trailer in combination forming a tractor trailer;
storing a second drone on the vehicle in a second drone pod located on a top portion of said truck, said second drone being an aerial drone;
deploying the first drone in the form of an unmanned wheeled vehicle, unmanned tracked vehicle, or unmanned boat, the first drone including one or more sensors;
operating the first drone to capture sensor data from a position offset from the position of the vehicle; and
operating the first drone to wirelessly communicate captured sensor data, said captured sensor data including video or other information that can be used to control maneuvering when flying of the second drone is not possible due to weather, insufficient headroom, or legal restrictions.

2. The method of claim 1, wherein deploying the first drone includes lowering the first drone from the first storage location on the vehicle.

3. The method of claim 1, wherein the first drone pod does not extend above the top of wheels on the truck.

4. The method of claim 3, wherein the first drone is a wheeled drone.

5. The method of claim 3, further comprising:
operating a control system in the vehicle to control vehicle movement as a function of sensed data communicated by said first drone to said vehicle control system or to a remote operator control; and
wherein said control system automatically controls the vehicle to perform a parking operation taking into consideration a position of at least one object in an environment in which the vehicle is located, said position of the at least one object having been determined based on the sensed data.

6. The method of claim 5, further comprising:
operating the control system to receive from a remote control station an indication of a parking location in which to park said vehicle, said parking location being a parking space which is visible in an image captured by said first drone.

7. The method of claim 6, further comprising:
operating the remote control station to receive said image captured by said first drone, said image communicated from the drone via a communications path including a wireless link;
operating the remote control station to display said image to a human operator;
operating the remote control station to receive operator input indicating which location of a plurality of available locations the vehicle is to park in; and
operating the remote control station to communicate the human operator indicated parking location in which the vehicle control system is to park the vehicle.

8. A system, the system comprising:
a vehicle in the form of a truck, the truck including a first storage location in the form of a first drone pod for storing a first drone, said first drone pod being located on a bottom portion of said truck, said truck further including a second drone pod located on a top portion of said truck, said second drone pod for storing an aerial drone, said truck being a wheeled vehicle in the form of a tractor unit for pulling a trailer, the truck and trailer in combination forming a tractor trailer;

said first drone, said first drone being in the form of an unmanned wheeled vehicle, unmanned tracked vehicle or unmanned boat, the first drone including one or more sensors;
  a drone control system including a processor configured to:
    control deployment of the first drone;
    control the first drone to capture sensor data from a position offset from the position of the vehicle; and
    control the first drone to wirelessly communicate captured sensor data, said captured sensor data including video or other information that can be used to control maneuvering when flying of the second drone is not possible due to weather, insufficient headroom, or legal restrictions.

9. The system of claim 8, wherein the processor is configured to control lowering of the first drone from the first storage location on the vehicle as part of controlling deployment of the first drone.

10. The system of claim 8, wherein the first drone pod does not extend above the top of wheels on the truck.

11. The system of claim 10, wherein the first drone is a wheeled drone.

12. The system of claim 10, further comprising:
  a vehicle control system configured to control vehicle movement as a function of sensed data communicated by said first drone to said vehicle control system or to a remote operator control system, as part of controlling said vehicle to park in a location visible in an image captured by said first drone.

13. The system of claim 12, further comprising:
  a wireless interface located in said vehicle, the wireless interface being configured to receive from a remote control station an indication of a parking location in which to park said vehicle, said parking location being a parking space which is visible in an image captured by said first drone.

14. The system of claim 13, wherein the processor in the drone control system is configured to control the first drone to communicate to the remote control station said image captured by said first drone via a communications path including a wireless link; and
  wherein the system further includes a remote control station, said remote control station including a processor configured to control the remote control station to:
    display said image to a human operator;
    receive operator input indicating which location of a plurality of available locations the vehicle is to park in; and
    communicate the human operator indicated parking location in which the vehicle control system is to park the vehicle.

15. The system of claim 8, wherein the truck is an unmanned truck.

16. A non-transitory computer readable medium including processor executable instructions, which when executed by one or more processors, controls a system to:
  deploy, from a vehicle in the form of a truck, a first drone in the form of an unmanned wheeled vehicle, unmanned tracked vehicle or unmanned boat, the first drone including one or more sensors, said truck including a first storage location in the form of a first drone pod for storing said first drone, said first drone pod being located on a bottom portion of said truck, said truck further including a second drone pod located on a top portion of said truck, said second drone pod for storing an aerial drone, said truck being a wheeled vehicle in the form of a tractor unit for pulling a trailer, the truck and trailer in combination forming a tractor trailer;
  operate the first drone to capture sensor data from a position offset from the position of the vehicle; and
  operate the first drone to wirelessly communicate captured sensor data, said captured sensor data including video or other information that can be used to control maneuvering when flying of the second drone is not possible due to weather, insufficient headroom, or legal restrictions.

* * * * *